United States Patent [19]

Rainville

[11] 4,111,635

[45] Sep. 5, 1978

[54] MANIFOLD IN SUBSTANTIAL ALIGNMENT WITH PLASTICIZER

[75] Inventor: Dewey Rainville, Westfield, N.J.

[73] Assignee: Rainville Company, Inc., Middlesex, N.J.

[21] Appl. No.: 783,741

[22] Filed: Apr. 1, 1977

[51] Int. Cl.² .................. B29P 23/02; B29F 1/06; B29B 1/14
[52] U.S. Cl. ................... 425/533; 425/534; 425/572
[58] Field of Search ............ 425/535, 572, 557, 562, 425/567, 570, 574, 577, 538, 190, 534, 533; 264/98, 99, 328

[56] References Cited

U.S. PATENT DOCUMENTS

| | | | |
|---|---|---|---|
| 3,577,291 | 5/1971 | Uchida | 264/98 X |
| 3,616,491 | 11/1971 | Vollers | 425/535 X |
| 3,704,723 | 12/1972 | Wheaton et al. | 425/190 X |
| 3,940,223 | 2/1976 | Farrell | 425/562 X |
| 3,940,224 | 2/1976 | Armour | 425/538 |

FOREIGN PATENT DOCUMENTS

| | | | |
|---|---|---|---|
| 1,132,319 | 6/1962 | Fed. Rep. of Germany | 425/572 |
| 2,011,653 | 9/1971 | Fed. Rep. of Germany | 425/572 |

*Primary Examiner*—Francis S. Husar
*Assistant Examiner*—William R. Briggs
*Attorney, Agent, or Firm*—Roy C. Hopgood; John M. Calimafde; Charles W. Neill

[57] ABSTRACT

Multi-cavity molds, such as used for injection blow-molding apparatus, have manifolds through which molten plastic is supplied from a plasticizer to the individual mold cavities. Some plastic molding materials, referred to as "heat-sensitive," deteriorate if they remain in the manifold for any substantial length of time. This manifold is constructed with its cross-section and branch passages correlated in such a way that there is no space in the manifold where plastic can accumulate out of the stream of feeding plastic. By keeping the plastic moving, in all parts of the manifold during each injection operation, deterioration of heat-sensitive plastic in the manifold is avoided.

8 Claims, 6 Drawing Figures

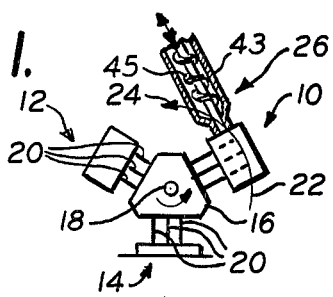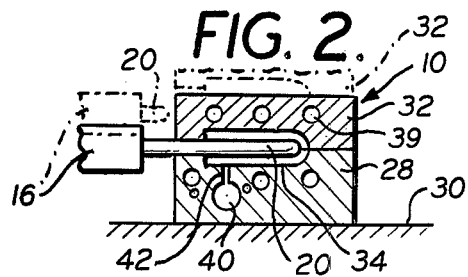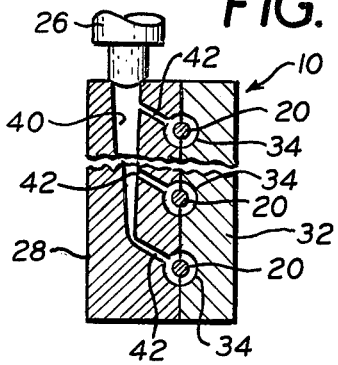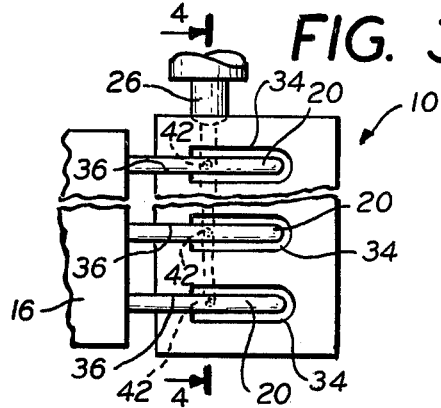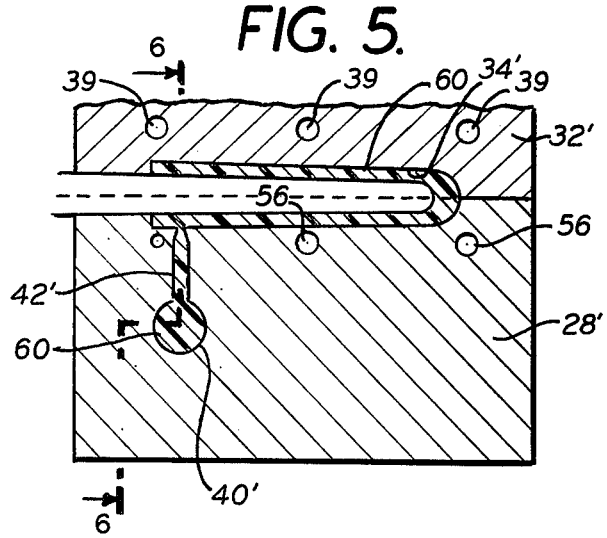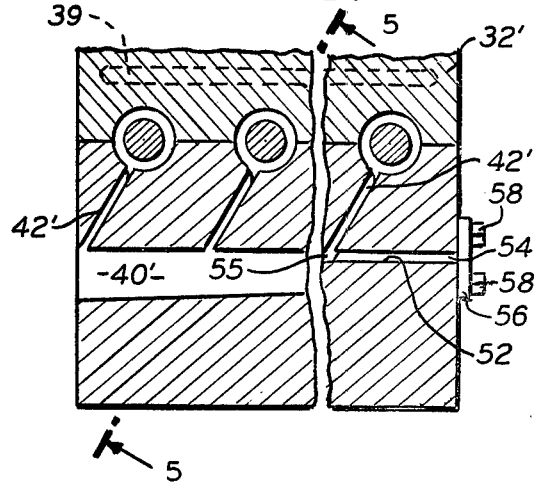

MANIFOLD IN SUBSTANTIAL ALIGNMENT WITH PLASTICIZER

BACKGROUND AND SUMMARY OF THE INVENTION

Multi-cavity injection molds require a manifold with passages leading from the manifold to the respective mold cavities. The common practice has been to have an inlet passage at the back of the mold and through which a plasticizer injects molten plastic into a manifold that extends at right angles to the inlet passage. Such manifolds have branch passages leading to the individual cavities of the mold and extending at right angles to the manifold.

The injected material has had to flow around a right angle in entering the manifold from the inlet passage, and then flow around another right angle in order to pass from the manifold into the respective cavities. In such a manifold system, the flow of the molten plastic is at very different velocities at different places in the cross-section of the manifold system. Material can accumulate along sides or at changes of direction of the main flow of the material, and such accumulated material may remain in one place for extended periods.

With heat-sensitive materials, such delays in passage through the manifold provide sufficient time for deterioration and, if the material eventually reaches the mold cavities, the products made by injection blow-molding apparatus are not uniform and some of them are defective.

This invention has the manifold open through one side of the mold instead of being supplied through an opening at the back of the mold. Thus the molten material from the plasticizer flows into the manifold in the same direction that the material in the manifold flows to the branch passages leading to the mold cavities. The preferred embodiment of this invention has the manifold taper to progressively smaller cross-section as it leads away from the inlet end, and has branch passages which extend at acute angles to the axis of the manifold so that plastic material enters the branch passages with a change of direction substantially less than 90°. The manifold has no dead spaces in which plastic material can accumulate, and all of the material in the manifold flows at substantially uniform rates of flow.

The inlet end of the manifold is preferably located under the path along which the core rods travel from the injection mold to a blowing mold. This permits the manifold to be located where the branch passages can communicate with the mold cavities at the neck end of the cavities for more uniform temperature distribution in the individual cavities. The stationary portion of the mold is constructed with the manifold low enough so that the portions of the plasticizer that extend under the path of movement of the core rods is below the level of the core rods when they move from one mold to the next.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic view of injection blow-molding apparatus made in accordance with this invention;

FIG. 2 is a diagrammatic view of an injection mold with core rods therein and showing the location of the manifold beneath the mold cavities;

FIG. 3 is a top plan view of the apparatus shown in FIG. 2 but with the upper section of the mold removed;

FIG. 4 is a sectional view taken on the line 4—4 of FIG. 3;

FIG. 5 is an enlarged sectional view similar to FIG. 2 but showing a modified form of the invention; and FIG. 6 is a sectional view, partly broken away, taken on the line 6—6 of FIG. 5.

DESCRIPTION OF PREFERRED EMBODIMENT

FIG. 1 shows injection blow-molding apparatus including an injection station including a mold 10, a blowing station 12 and a stripper station 14 located at equiangular distances around an indexing head 16 which rotates about the axis of a shaft 18 which raises and lowers the indexing head 16 to lift the core rods clear of the fixed or stationary mold sections when the core rods are to be shifted from one station to the next. The indexing head 16 rotates counterclockwise in FIG. 1, as indicated by the arrow on the indexing head.

When the indexing head 16 is in raised position, the core rods 20 sweep a path indicated by the line 22, which has the arrowhead 24. A plasticizer 26 is positioned in contact with the side of the injection mold 10 for supplying successive charges of molten material into the manifold of the injection mold 10.

FIGS. 2 and 3 show an injection mold 10 having a lower stationary section 28 secured to a frame 30 of the apparatus. An upper movable mold section 32 contacts with the lower section 28 when the mold is closed, as shown in FIG. 2. The injection mold 10 contains a plurality of mold cavities 34 extending parallel to one another.

There are openings 36 through the front face 38 of the mold 10 for each of the core rods 20. A core rod 20 extends into each of the mold cavities 34 through one of the openings 36; and the core rods are firmly clamped by the mold, when the mold is closed, so that no molten material can escape from the cavities 34 around the clamped neck portions of the core rods at the openings 36.

The upper section 32 of the mold 10 moves into the dotted line position shown in FIG. 2 when the mold opens. The indexing head 16 rises to the dotted line position to lift the core rods 20 clear of the bottom mold section 28 so that the core rods can swing from the injection mold to the blowing mold.

The mold includes passageways 39 for fluid to control the temperature of the mold.

A manifold 40 extends parallel to the front face 38 of the mold 26, and this manifold 40 has branch passages 42 leading from the manifold into the mold cavities 34 near the neck ends of the core rods 20.

FIG. 4 shows the way in which the plasticizer 26 has its nozzle fit into the inlet end of the manifold 40 in substantial alignment with the longitudinal axis of the manifold 40, so that molten material from the plasticizer 26 enters the manifold 40 without any change in the direction of flow. The branch passages 42 leading to the different mold cavities 34 are shown in FIG. 4 extending at acute angles to the axis of the manifold so that plastic material flows from the manifold 40 into the successive passages 42 with only a limited change in direction, which is substantially less than the right angle required by conventional manifolds.

The plasticizer 26 can be of conventional construction. No change is necessary, but the plasticizer is located at the side of the mold instead of at the back. FIG. 1 shows the conventional plasticizer barrel 43 with a feed screw 45 which advances the molten plastic as a screw conveyor and which reciprocates toward the mold for an injection stroke, and away from the mold to draw back the plastic charge.

Another feature of the manifold 40 is that it tapers to progressively smaller cross-sections, so that the cross-section is approximately proportional to the volume of material which has to flow at any part of the manifold along its length. Preferably, the cross-section of the manifold at any location is approximately equal to the combined cross-sections of the branch passages 42 opening into the manifold beyond that location.

Modifications can include the making of the manifold of a separate structure, insulated from the mold by a thin layer of insulating material, so as to allow operation of the mold at a lower temperature than the manifold.

FIG. 5 shows a modified form of the invention. Parts in FIGS. 5 and 6 which correspond with those in FIGS. 2–4 are indicated by the same reference character with a prime appended. FIGS. 5 and 6 show plastic material 60 in the mold cavity 34' and also show the plastic 60 in the manifold 40' and in the branch passage 42'. The plastic material is not shown in the other figures, in order to simplify the drawing.

The passages 42' extend at an acute angle to a longitudinal axis of the manifold with the end of each branch passage that opens into the manifold 40 closer to the inlet end of the manifold than is the end of the branch passage that opens into the mold cavity. The discharge end of each branch passage is constricted. This construction reduces the cross-section of the plastic stream where it enters the cavity, and this "pin point gating" causes the plastic in the passage 40' to make a clean break from the parison on the core rod on drawback of the plastic in the passages 40'.

The construction shown in FIG. 6 also has a feature for purging the manifold 40'. At the end of the manifold 40' there is an opening 52 which extends through a side of the mold in substantial alignment with the manifold 40'. A plug 54 fits into and fills the opening 52 when the mold is in use. The plug 54 preferably extends all the way to the last branch passage 42' and can have a sloping end face 55 to maintain the streamline flow of the plastic in the manifold.

The plug 54 is attached to a flange 56 that is secured to the side of the mold by bolts 58 that thread into the mold. When the manifold 40' is to be purged, the bolts 58 are removed and the plug 54 is withdrawn from the opening 52, leaving the manifold 40' open at both ends.

The mold includes passageways 39 for fluid to control the temperature of the mold.

The preferred embodiment of the invention has been illustrated and described, but changes and modifications can be made, and some features can be used in different combinations without departing from the invention as defined in the claims.

What is claimed is:

1. Injection blow-molding apparatus, for use with heat-sensitive molding material, including a multicavity mold having a front face and a back face extending lengthwise of the mold between side faces that are at opposite sides of the mold, the mold having two sections, one of which is a relatively fixed section, and the other of which is movable toward and from the fixed section to close and open the mold, recesses in confronting surfaces of the mold sections and in position to form a plurality of mold cavities when the mold is closed, other recesses in the confronting surfaces in position to form passages through the front face of the mold and leading into the respective cavities when the mold is closed, said passages having surfaces that grip core rods that extend into the respective cavities for receiving plastic parisons, a manifold in the fixed section of the mold and below the mold cavities with discharge outlets comprising branch passages leading upward to the respective cavities of the mold, the manifold extending lengthwise of the mold and under the mold cavities and having an inlet that opens through one of the side faces of the mold for receiving plastic material from a discharge outlet of a plasticizer and through which the material flows from the plasticizer and through the manifold to said outlets leading to the respective cavities, the manifold extending substantially at right angles to the side face at which plastic material flows into the manifold from the plasticizer said manifold having a cross-section with continuous curvature of the inside surface of the manifold at right angles to the length thereof and with the manifold tapering to progressively smaller cross-sections as it extends away from its inlet end and to the discharge outlets leading to the respective cavities of the mold.

2. The injection blow-molding apparatus described in claim 1 characterized by substantially uniform cross-sectional branch passages leading from the manifold to the respective cavities, each of said branch passages having its entrance end portion extending at an acute angle to a longitudinal axis of the manifold with the end of each branch passage that opens into the manifold closer to the inlet end of the manifold than is the end of the branch passage that opens into its mold cavity.

3. The injection blow-molding apparatus described in claim 1 characterized by each cavity having a space at one end for clamping a neck portion of a core rod, the branch passages opening into the mold cavities adjacent to the neck end of the cavity.

4. The injection blow-molding apparatus described in claim 1 characterized by the mold having a fixed section and a movable section that moves toward and from the fixed section to open and close the mold cavities, the manifold being in the fixed section of the mold and nearer to the front face than to the back face.

5. The injection blow-molding apparatus described in claim 1 characterized by the cross-section of the manifold at each branch passage being proportional to the combined cross-sections of the branch passages beyond that branch passage in the direction of plastic flow through the manifold.

6. The injection blow-molding apparatus described in claim 1 characterized by a plasticizer, and means for moving the plasticizer into and out of contact with the inlet end of the manifold and in a direction that is substantially tangent to a circle that is concentric with a center of rotation about which core rods of the blow molding apparatus move from one operating station of the apparatus to the next operating station.

7. The injection blow-molding apparatus described in claim 1 characterized by an indexing head from which the core rods extend, the indexing head having a plurality of faces at substantially equal angular spacing around an axis of rotation of the indexing head, said indexing head having a direction of rotation that brings the core rods to the mold from one side of the mold, and the inlet end of the manifold and a plasticizer being located at the other side of the mold.

8. Injection blow-molding apparatus described in claim 7 characterized by the inlet end of the manifold being located below the path travelled by the core rods in passing from the injection mold to a blowing mold as the indexing head rotates, means raising the level of the indexing head and the core rods when moving the core rods from the injection mold to the blowing mold, and the portion of the plasticizer that contacts with the side of the mold during injection and that comes under the path of movement of the core rods being located entirely below said path of movement of the core rods when said rods are travelling from the injection mold to the blowing mold with the indexing head at its raised level.

* * * * *